United States Patent [19]

Zander

[11] Patent Number: 5,601,939
[45] Date of Patent: Feb. 11, 1997

[54] BATTERY CONTACT ARRANGEMENT AND BATTERY REMOVAL TOOL

[75] Inventor: Dennis R. Zander, Penfield, N.Y.

[73] Assignee: Eastman Kodak Company, Rochester, N.Y.

[21] Appl. No.: 464,183

[22] Filed: Jun. 5, 1995

[51] Int. Cl.$^6$ ............................................. H01M 2/10
[52] U.S. Cl. ........................... 429/98; 429/96; 429/97; 429/100; 396/539
[58] Field of Search .......................... 429/96, 97, 98, 429/123, 121, 100, 187; 354/288

[56] References Cited

U.S. PATENT DOCUMENTS

| | | | |
|---|---|---|---|
| 925,452 | 6/1909 | Brown | 429/123 |
| 3,930,889 | 1/1976 | Ruggiero et al. | 429/97 |
| 4,107,400 | 8/1978 | Grohoski | 429/100 |
| 4,297,635 | 10/1981 | Stevens | 429/100 |

FOREIGN PATENT DOCUMENTS 2-126362  10/1990  Japan .

*Primary Examiner*—John S. Maples
*Assistant Examiner*—Carol Chaney
*Attorney, Agent, or Firm*—Roger A. Fields

[57] ABSTRACT

A battery especially useful in single use cameras has the insulative layer or wrapping removed therefrom to expose the metal jacket of the battery which functions as the positive terminal of the battery. The battery is then slid longitudinally into a cylindrical cavity in the camera to axially engage a first contact with the negative terminal of the battery and to be engaged radially by a second contact which contacts the metal jacket. In accordance with one embodiment of the invention, the metal jacket is contacted at a point between a groove in the jacket and a second end face of the battery which is unitary with the metal jacket. In accordance with a preferred embodiment of the invention, the second contact has a spring arm with an edge which engages a wall of the groove so as to prevent removal of the battery by the customer. A special battery extracting tool is provided at film developing centers for dislodging the second contact from the groove and pulling the battery from the cylindrical recess in the camera.

8 Claims, 2 Drawing Sheets

BATTERY CONTACT ARRANGEMENT AND BATTERY REMOVAL TOOL

FIELD OF THE INVENTION

The present invention relates to a battery contact arrangement and battery removal tool, and more particularly, the present invention relates to a battery contact arrangement and battery removal tool, especially useful with photographic cameras.

BACKGROUND OF THE INVENTION

Many photographic cameras utilize AA batteries configured with a negative contact on a first end face of the battery and a positive contact on a second end face of the battery, axially displaced from the first end face. The positive contact is actually an exposed portion of the metal battery jacket which is normally covered with a paper or plastic label which serves as an insulating wrapper.

As is illustrated in Japanese Kokai 2-126362, if for some reason one wishes to make contact with the positive pole of the battery at a location other than the second end face of the battery, contact may be made on the cylindrical metal jacket. In Kokai '362, the battery is inserted into the camera in a radial direction as opposed to a longitudinal or axial direction. Insertion in the radial direction, rather than the longitudinal or axial direction, requires that substantially more surface area of the camera housing be devoted to a door, which for at least some camera configurations may be undesirable.

In current 35 mm, single use cameras (SUCs), a single battery is used with contacts at each end face. This requires that a circuit board connected to the battery extend under both ends of the battery or that a relatively long metal lip be used to connect the circuit board to the positive end face of the battery. In addition, from time to time, customers remove batteries from SUCs prior to returning the SUCs for development. This compromises assurance that used batteries will be properly disposed of.

As cameras perform more complex functions, there is always a need for additional space within the camera housing to accommodate additional mechanisms. In addition, there is a continual need to reduce the overall size and weight of cameras. As a result, there is a need for a battery contact arrangement which accommodates batteries without labels so that narrower circuit boards and more compact contact configurations may be utilized. In addition, arrangements are needed in which batteries may not be removed without difficulty by the customer, yet may be removed quickly and conveniently when a single use camera is returned for development of the film therein.

SUMMARY OF THE INVENTION

According to the invention there is provided an arrangement for configuring battery contacts in a device such as a photographic camera which utilizes a cylindrical battery having a first battery terminal on a first radial end face thereof and a second battery terminal comprised of a conductive battery. The conductive jacket has a groove positioned proximate the first radial end face of the battery and includes therewith a second end face which is unitary with the jacket. The battery is received in a cavity within a housing of the device for electrical connection to a printed circuit board within the housing. In accordance with the present invention, the improvement comprises a first contact disposed within the housing having a contact area facing the axial end face of the battery for making contact with the first battery terminal upon the battery being axially slid into engagement with the first contact. A second contact engages the second battery terminal at the peripheral location on the battery jacket. The second contact has an axially facing edge for engaging the groove in the jacket at the location of a wall facing away from the first face of the battery. The surfaces defining the cavity are disposed to limit motion of the battery in the recess to longitudinal motion therein, wherein the axially facing edge of the second contact retains the battery in the recess, as well as establishing an electrical connection upon engaging the wall of the groove.

In a further aspect, the present invention includes a battery extraction tool having a longitudinally extending probe for insertion into the cavity in order to dislodge the battery.

The present invention has the advantage of allowing smaller printed circuit boards to be utilized in devices such as cameras. Moreover, the present invention makes it difficult for customers to remove batteries from items such as single use cameras without access to specialized tooling and methods.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE INVENTION

The invention is disclosed as being especially useful in 35 mm single use cameras (SUCs). Some customers remove batteries from these cameras and use the batteries for other purposes which frustrates proper disposal of the batteries. By utilizing the following arrangement, customers will tend to leave the batteries in single use cameras because it is difficult to remove the batteries without the knowledge and use of a specialized tool.

In addition, by removing battery labels and wrapping, the cost of the batteries is reduced and there is no need to dispose of wrappings and labels when the batteries are disposed of. In order to discourage extraction of the batteries, it is also proposed to remove, or otherwise disable, the positive terminal projections disposed on battery end faces so that the batteries will not function in devices other than the single use cameras in which they are incorporated. While the features of the present invention are especially useful in 35 mm single use cameras, it is to be understood that these features may have uses in other devices which utilize the battery configuration disclosed herein.

Figure 1:
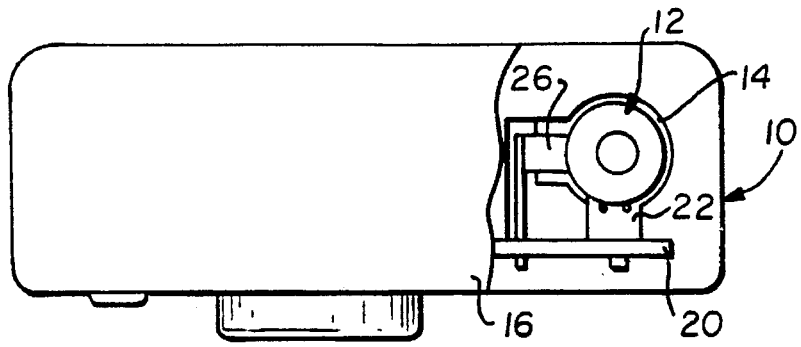
FIG. 1 is a bottom view of a camera, with portions broken away, showing where a battery is inserted into the camera.

The Camera (FIG. 1)

Referring now to FIG. 1, there is shown a camera 10 which, for the purposes of the present invention, is a single use 35 mm camera in which a single cylindrical battery 12, such as a AA battery, is utilized. The single battery 12 is slid in a longitudinal direction into a substantially cylindrical cavity 14 within the housing 16 of the camera 10 and retained therein by a compartment door 18 (see for example FIGS. 5 and 6). Within the camera 10, a printed circuit board 20 is disposed for controlling various features of the camera, such as, for example, the camera flash. The printed circuit board 20 has a first contact 22 for engaging a negative terminal 24 of the battery 12 and a second contact 26 for engaging the positive terminal 28 of the battery. In accordance with the present invention, the first contact 22 faces the battery 12 axially and the second contact 26 faces the battery radially.

Figure 2:
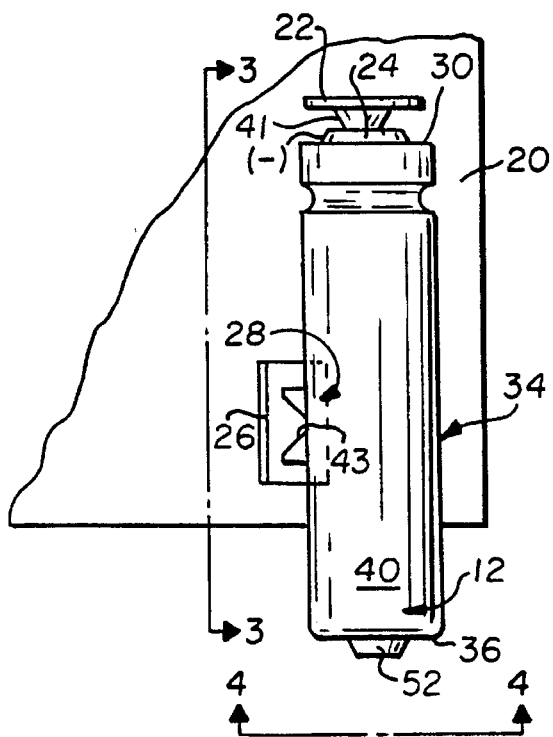
FIG. 2 is a side view of a first embodiment of the invention showing a battery mounted on a printed circuit board.
Figure 3:
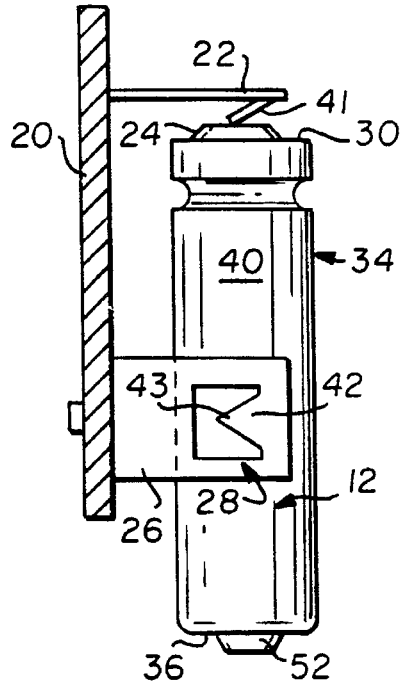
FIG. 3 is a side view taken in the direction of arrows 3—3 of FIG. 2.
Figure 4:
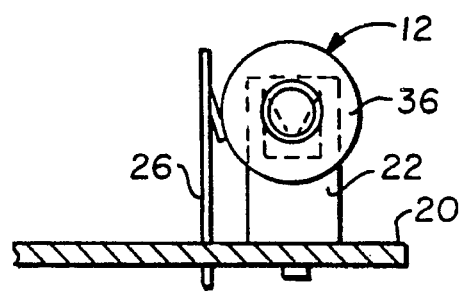
FIG. 4 is an end view taken in the direction of arrows 4—4 of FIG. 2.

First Embodiment of the Invention (FIGS. 2–4)

Referring now to FIGS. 2–4, it is seen that the battery 12 configured in accordance with the principles of the present invention has an end face 30 with a first terminal which is the negative terminal 24 of FIG. 1 and an exposed jacket 34 which is unitary with a second axial end face 36 of the battery and provides a second terminal which is the positive terminal 28 of FIG. 1. The insulative label or wrapping has been stripped from the battery to expose a cylindrical surface 40 of the jacket 34 which can be contacted at any location to provide the positive terminal 28.

In the embodiment of FIGS. 2–4, the first contact 22 has struck therefrom a spring arm 41 which engages the negative terminal 24 while the second contact 26 has struck therefrom a pointed tab 42 which engages the cylindrical surface 40 of the jacket 34 that provides the positive terminal 28. The side wall of the substantially cylindrical cavity 14 which receives the battery 12 restrains the battery to longitudinal sliding motion in the direction of its axis so that, as the battery is slid into the camera, a point 43 of the tab 42 establishes electrical contact with the cylindrical surface 40 of the battery 12. In order to discourage re-use of the battery 12, the conventional positive terminal contact in the form of a bump 52 disposed on the second end face 36 of the battery 12 can be removed so that the battery will not function in devices which require an axially facing positive terminal.

As is apparent in FIGS. 2 and 3, the printed circuit board 20 need not extend to or past the second end face 36 of the battery 12. Consequently, the printed circuit board 20 can be made smaller since there is no need to conform the width or length of the printed circuit board to the length of the battery 12. Moreover, there is no need to provide an elongated contact extending from the printed circuit board 20 to a location behind the second end face 36 of the battery 12. Such an elongated contact complicates the construction of the camera 10 because there needs to be some way to axially slide the battery 12 in place and then establish an electrical contact by, for example, closing the door 18. By removing the insulative label or wrapping, a number of advantages are achieved, such as simplifying electrical connections and minimizing printed circuit board size.

Figure 5:
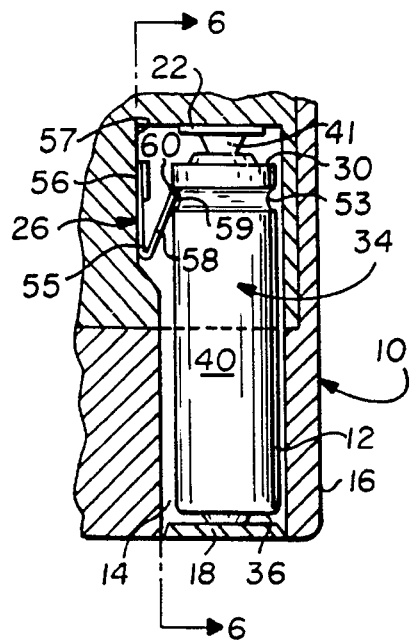
FIG. 5 is a side view of a second, preferred, embodiment of the invention.
Figure 6:
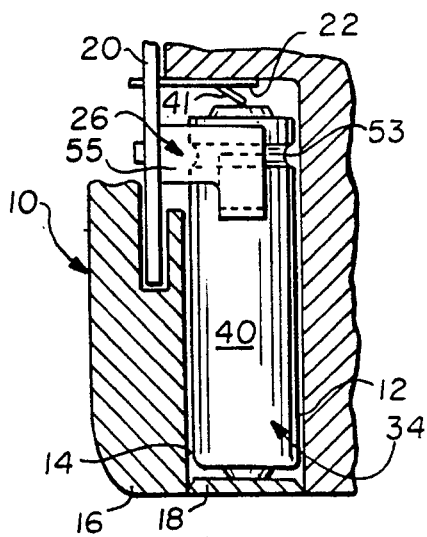
FIG. 6 is a side view taken in the direction of arrows 6—6 of FIG. 5.

Second Embodiment of the Invention (FIGS. 5 and 6)

Referring now to FIGS. 5 and 6, where a preferred embodiment of the invention is shown, it is seen that a second contact 52, which is a positive terminal contact, is configured to engage within an annular groove 53 in the cylindrical surface 40 of the conductive metal jacket 34. The first contact 22 is configured with essentially the same configuration as in FIGS. 2–4, wherein the spring arm 41 engages the negative terminal 22.

In the embodiment of FIGS. 5 and 6, it is seen that the second contact 26 extends from the printed circuit board 20 on a strut 54 having a V-shaped contact member 55. The V-shaped contact member 55 has a first arm 56 which is disposed against a side wall portion 57 of the cavity 14 and a second arm 58 which extends toward the battery 12. As is seen best in FIG. 5, the second spring arm 58 has an edge 59 which engages a wall 60 of the groove 53, which wall 60 faces away from the first end face 30 of the battery 12 and toward the second end face 36 of the battery. When the battery 12 is shoved longitudinally into the cylindrical recess 14, the spring arm 41 of the first electrical contact 22 establishes an electrical connection with the negative terminal 32 while the second spring arm 58 of the second contact 52 establishes electrical contact with the metal jacket 40 at the area of the groove 53. Since the edge 59 of the second spring arm 58 engages the wall 60 of the annular groove 53, the battery 12 cannot be extracted by simply opening the door 18 and shaking the camera 10 or by in some way gripping the battery proximate the second end face 36 and pulling the battery from cylindrical cavity 14 in the camera housing 16. Consequently, the customer is discouraged from removing the battery 12 and using the battery for some other purpose.

Figure 7:
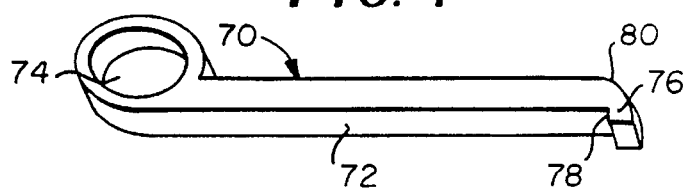
FIG. 7 is a perspective view of a battery extraction tool.
Figure 8:
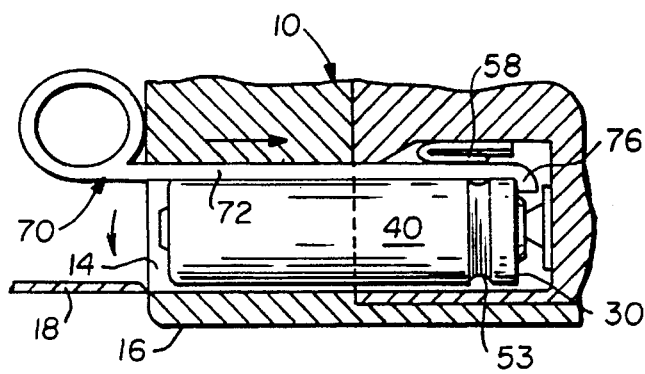
FIG. 8 is a side view showing the battery retraction tool of FIG. 7 inserted in a battery cavity of a camera.
Figure 9:
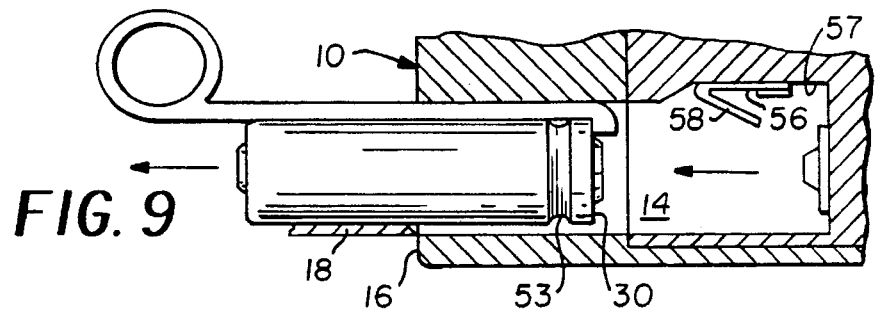
FIG. 9 is a view similar to FIG. 8 but showing the battery extraction tool removing the battery tram the cavity of the camera.

The Extraction Tool (FIGS. 7–9)

Referring now to FIGS. 7, 8 and 9, there is shown an extraction tool 70 which is used to remove the battery 12 from the cylindrical cavity 14 after the door 18 is opened. The extraction tool 70 has a shank 72 with a loop 74 defining a finger hole at one end and a removal hook 76 at the other end. As is seen in FIG. 8, the removal hook 76 has a shoulder 78 for engaging the first end face 30 of the battery 12 and a ramp 80 which engages the second spring arm 58 to cam the second spring arm away from the groove 53. As is seen in FIG. 9, the battery 12 is removed from the cylindrical cavity 14 by tugging at the loop 74 forming the finger hole to slide the battery 12 past the second spring arm 58.

The extraction tools 70 are located only at film processing centers and are not available to the customers. Accordingly, film processing centers can extract the batteries 12 for proper disposal when processing exposed film within the cameras 10 while customers are discouraged from extracting batteries for their own purposes.

Parts List

10 Camera
12 Battery
14 Cavity
16 Housing
18 Door
20 Printed circuit board
22 First contact
24 Negative terminal
26 Second contact
28 Positive terminal
30 First axial end face
34 Exposed jacket
36 Second end face
42 Tab
43 Point
52 Second contact
53 Annular groove
54 Strut
55 V-shaped contact member
56 First spring arm
58 Second spring arm
60 Wall portion
70 Extraction tool
72 Shank
74 Loop
76 Removal hook 40 Cylindrical surface of jacket
41 Spring arm
42 Tab
43 Point
52 Second contact
53 Annular groove
54 Strut
55 V-shaped contact member
56 First spring arm
58 Second spring arm
60 Wall portion
70 Extraction tool
72 Shank
74 Loop
76 Removal hook
78 Shoulder The invention has been described with reference to a preferred embodiment thereof. It will, however, be appreciated that variations and modifications can be effected to the disclosed invention within the ordinary skill in the art without departing from the scope of the invention.

What is claimed is:

1. In a photographic camera, a combination comprising:

a cylindrical battery having a longitudinal axis, the battery having a first battery terminal on a first end face thereof and a second battery terminal comprised of a conductive cylindrical jacket having a second end face unitary with the jacket, the jacket having a peripheral groove therein;

a camera housing having a cavity therein, the cavity being closed at a first end and open at a second end, the housing including a cover for closing the cavity, the cavity having a wall for limiting motion of the battery when the battery is inserted into the cavity to longitudinal sliding motion with respect to the axis of the battery;

a first contact disposed within the cavity at the first end of the cavity and having a contact area facing the axial end face of the battery when the battery is slid into the cavity for making contact with the first battery terminal;

a second contact for engaging the second battery terminal in the groove in the conductive cylindrical jacket of the battery; and a printed circuit board within the housing, the printed circuit board having the first and second contacts mounted thereon.

2. The combination of claim 1, wherein the printed circuit board has a length no greater than the distance between the first and second end faces of the battery.

3. The combination of claim 1, wherein the groove in the cylindrical conductive jacket has a wall portion facing away from the first end face and the second contact has an axially facing edge which engages the wall portion to positively retain the battery in the cavity.

4. The combination of claim 3 further including a battery extraction tool having a longitudinally extending probe for insertion into the cavity to dislodge the battery.

5. The combination of claim 4, wherein the probe has a cam thereon for deflecting the axially facing edge of the second contact radially away from the battery and an axially facing shoulder thereon for engaging a radial surface of the battery for longitudinally extracting the battery from the cavity.

6. The combination of claim 1, wherein the first and second contacts are spring arm contacts.

7. The combination of claim 1, wherein the spring arm contacts are unitary with struts extending from the printed circuit board.

8. The combination of claim 1, wherein the cavity is cylindrical and has walls made of dieletrically insulative material.

* * * * *